US010316469B2

(12) United States Patent
Zhang et al.

(10) Patent No.: US 10,316,469 B2
(45) Date of Patent: Jun. 11, 2019

(54) ON-LINE CONTROL AND REACTION PROCESS FOR PH ADJUSTMENT (71) Applicant: Ecolab USA Inc., St. Paul, MN (US)

(72) Inventors: Meng Zhang, Shanghai (CN); Na Xu, Shanghai (CN); Jun Li, Shanghai (CN); Yulin Zhao, Shanghai (CN)

(73) Assignee: Ecolab USA Inc., St. Paul, MN (US)

( * ) Notice: Subject to any disclaimer, the term of this patent is extended or adjusted under 35 U.S.C. 154(b) by 55 days.

(21) Appl. No.: 15/537,018

(22) PCT Filed: Dec. 9, 2015

(86) PCT No.: PCT/US2015/064600
§ 371 (c)(1),
(2) Date: Jun. 16, 2017

(87) PCT Pub. No.: WO2016/100020
PCT Pub. Date: Jun. 23, 2016

(65) Prior Publication Data
US 2017/0342663 A1 Nov. 30, 2017

(30) Foreign Application Priority Data
Dec. 16, 2014 (CN) .......................... 2014 1 0784829

(51) Int. Cl.
D21H 23/10 (2006.01)
G05B 13/00 (2006.01)
C08J 3/21 (2006.01)
D21H 21/18 (2006.01)
D21H 23/06 (2006.01)
G05D 21/02 (2006.01)
D21H 17/37 (2006.01)
C08J 3/00 (2006.01)
D21H 21/20 (2006.01)
D21H 23/08 (2006.01)
B01F 13/10 (2006.01)

(52) U.S. Cl.
CPC .............. D21H 23/10 (2013.01); C08J 3/005 (2013.01); C08J 3/21 (2013.01); D21H 17/375 (2013.01); D21H 21/18 (2013.01); D21H 21/20 (2013.01); D21H 23/06 (2013.01); D21H 23/08 (2013.01); G05B 13/00 (2013.01); G05D 21/02 (2013.01); B01F 2013/1091 (2013.01); C08J 2333/26 (2013.01); C08J 2433/26 (2013.01)

(58) Field of Classification Search
CPC ........ D21H 23/06; D21H 23/08; D21H 23/10; D21H 21/18; D21H 21/20; D21H 17/375; C08J 3/005; C08J 3/21; C08J 2333/26; C08J 2433/26; G05D 21/02; B01F 2013/1091; G05B 13/00
See application file for complete search history.

(56) References Cited

U.S. PATENT DOCUMENTS

| 4,181,567 | A | * | 1/1980 | Riddell | D21H 17/00 |
| | | | | | 162/168.3 |
| 4,940,739 | A | | 7/1990 | Seitz | |
| 5,362,573 | A | | 11/1994 | Pandian et al. | |
| 5,505,819 | A | * | 4/1996 | De Witt | D21H 11/08 |
| | | | | | 162/142 |
| 6,294,645 | B1 | | 9/2001 | Allen et al. | |
| 6,395,338 | B1 | | 5/2002 | Benayoun et al. | |
| 7,641,766 | B2 | | 1/2010 | St. John et al. | |
| 7,901,543 | B2 | | 3/2011 | St. John et al. | |
| 2002/0114891 | A1 | | 8/2002 | Benayoun et al. | |
| 2005/0155732 | A1 | | 6/2005 | Capwell | |
| 2006/0037727 | A1 | | 2/2006 | Hagiopol et al. | |
| 2006/0173570 | A1 | | 8/2006 | Stimpson | |
| 2006/0230346 | A1 | | 10/2006 | Bhogal et al. | |
| 2007/0151864 | A1 | | 7/2007 | Lee et al. | |
| 2008/0256387 | A1 | | 10/2008 | Butt et al. | |
| 2009/0071618 | A1 | | 3/2009 | Zhang et al. | |
| 2009/0150327 | A1 | | 6/2009 | Liu et al. | |
| 2010/0024515 | A1 | | 2/2010 | Hough | |
| 2010/0059387 | A1 | | 3/2010 | Kaczur et al. | |
| 2010/0199828 | A1 | | 8/2010 | Adkins | |
| 2010/0241864 | A1 | | 9/2010 | Kelley et al. | |
| 2012/0222771 | A1 | | 9/2012 | Burke et al. | |
| 2014/0006389 | A1 | | 1/2014 | Garcia et al. | |
| 2014/0051614 | A1 | | 2/2014 | Rico-Munoz et al. | |
| 2015/0222590 | A1 | | 8/2015 | Luo et al. | |
| 2016/0222590 | A1 | | 8/2016 | Zhu et al. | |
| 2016/0230346 | A1 | | 8/2016 | Zhu et al. | |

FOREIGN PATENT DOCUMENTS

| CN | 104452455 A | 3/2015 |
| CN | 104452463 A | 3/2015 |
| DE | 4403682 A1 | 8/1995 |
| EP | 0280661 A2 | 8/1989 |
| EP | 0343738 A2 | 11/1989 |
| JP | S55-63778 A | 5/1980 |
| JP | S58-150619 A | 9/1983 |
| JP | S58-210211 A | 12/1983 |
| JP | S59-88511 A | 5/1984 |
| JP | S59-161515 A | 9/1984 |
| JP | S59-173420 A | 10/1984 |
| JP | S59-206518 A | 11/1984 |

(Continued)

OTHER PUBLICATIONS

Desai, M.M.; pH Control Using a Heuristic Model: A Pilot Scale Demonstration, 1994, p. i-115.*

(Continued)

Primary Examiner — Robert S Jones
(74) Attorney, Agent, or Firm — Leydig Voit and Mayer, Ltd.

(57) ABSTRACT

An on-line control and reaction process for pH adjustment and a control device for automatically adjusting pH value are provided. The process includes mixing a first enhancer and a second enhancer, optionally after diluting the first enhancer and/or the second enhancer with water, to form a mixture, setting a base pH value ($\delta 1$) and a target pH value ($\delta 2$), and adding pH adjuster into the mixture via a pH control unit and mixing to obtain a product with the target pH value. The pH control unit adjusts the adding of the pH adjuster by measuring or inputting certain parameters.

11 Claims, 4 Drawing Sheets (56) References Cited

FOREIGN PATENT DOCUMENTS

| | | |
|---|---|---|
| JP | S60-190329 A | 9/1985 |
| JP | S61-261241 A | 11/1986 |
| JP | S63-87396 A | 4/1988 |
| JP | S63-91557 A | 4/1988 |
| JP | H02-276927 A | 11/1990 |
| JP | H04-348920 A | 12/1992 |
| JP | H05-192942 A | 8/1993 |
| JP | H06-17371 A | 1/1994 |
| JP | H06-229719 A | 8/1994 |
| JP | H06-302515 A | 10/1994 |
| JP | H07-100877 A | 4/1995 |
| JP | H07-331831 A | 12/1995 |
| JP | H09-53126 A | 2/1997 |
| JP | H09-242007 A | 9/1997 |
| JP | H09-245944 A | 9/1997 |
| JP | H09-248455 A | 9/1997 |
| JP | H09-309758 A | 12/1997 |
| JP | H10-2020 A | 1/1998 |
| JP | H10-141878 A | 5/1998 |
| JP | H10-159006 A | 6/1998 |
| JP | H10-159054 A | 6/1998 |
| JP | H10-237895 A | 9/1998 |
| JP | H11-3821 A | 1/1999 |
| JP | H11-115990 A | 4/1999 |
| JP | H11-117221 A | 4/1999 |
| JP | 3044028 B1 | 5/2000 |
| JP | 2000-252287 A | 9/2000 |
| JP | 2000-264725 A | 9/2000 |
| JP | 2000-264726 A | 9/2000 |
| JP | 2001-037868 A | 2/2001 |
| JP | 2001-198678 A | 7/2001 |
| JP | 2001-261903 A | 9/2001 |
| JP | 2001-350807 A | 12/2001 |
| JP | 2003-074185 A | 3/2003 |
| JP | 2003-322609 A | 11/2003 |
| JP | 2006-128668 A | 5/2006 |
| JP | 2007-237206 A | 9/2007 |
| JP | 2008-121327 A | 5/2008 |
| JP | 2010-236323 A | 10/2010 |
| JP | 2011-063879 A | 3/2011 |
| JP | 2013-147694 A | 8/2013 |
| JP | 2013-173998 A | 9/2013 |
| WO | WO 96/39263 A1 | 12/1996 |
| WO | WO 96/39264 A1 | 12/1996 |
| WO | WO 96/39265 A1 | 12/1996 |
| WO | WO 96/41687 A1 | 12/1996 |
| WO | WO 98/06898 A1 | 2/1998 |
| WO | WO 00/11046 A1 | 3/2000 |
| WO | WO 01/37193 A1 | 5/2001 |
| WO | WO 01/73543 A2 | 10/2001 |
| WO | WO 03/055747 A1 | 7/2003 |
| WO | WO 2004/008921 A1 | 1/2004 |
| WO | WO 2004/075072 A1 | 9/2004 |
| WO | WO 2005/052256 A2 | 6/2005 |
| WO | WO 2008/011138 A1 | 1/2008 |
| WO | WO 2008/147079 A1 | 12/2008 |
| WO | WO 2013/013891 A1 | 1/2013 |
| WO | WO-2013098480 A1 * 7/2013 ............ C09C 1/021 |
| WO | WO 2015/038905 A1 | 3/2015 |

OTHER PUBLICATIONS

Israel Patent Office, International Search Report in International Patent Application No. PCT/US2015/064600, dated Apr. 14, 2016 (4 pp.).

Israel Patent Office, Written Opinion in International Patent Application No. PCT/US2015/064600, dated Apr. 14, 2016 (6 pp.).

European Patent Office, Extended European Search Report in European Patent Application No. 15870712.5, 7 pp. (dated Apr. 20, 2018).

* cited by examiner

Fig. 1/Abs.Fig.

ON-LINE CONTROL AND REACTION PROCESS FOR PH ADJUSTMENT

CROSS-REFERENCE TO RELATED APPLICATIONS

This application is a national phase application of International Patent Application No. PCT/US2015/064600, filed Dec. 9, 2015, which claims priority to Chinese Patent Application No. 201410784829.5, filed Dec. 16, 2014, each disclosure of which is incorporated by reference herein in its entirety.

TECHNICAL FIELD

The present disclosure relates to an on-line control and reaction process for pH adjustment and to an on-line automatic control device for pH adjustment.

BACKGROUND ART

Strength (including dry strength, wet strength and temporary wet strength, etc.) is a structural property of paper, which mainly depends on the interfiber bond and the nature of fibers in the paper sheet. During the paper making process, the strength properties of paper can be improved by adding enhancers to the paper stock by adjusting the ratio of fibers and pulping to fibrillate as well as by virtue of film-forming properties of a surface sizing agent. An enhancer is usually divided into a dry strength and a wet enhancer.

Di-aldehyde modified cationic, anionic and amphoteric acrylamide polymers, particularly the glyoxalated modified diallyldimethylammonium chloride (DADMAC)/acrylamide copolymers (GPAMs), are widely used as a dry strength and temporary wet strength aid in the paper and paperboard area. Such polymer strength aid is of great interest for paper and paperboard manufacturer since (1) it provides good temporary wet strength together with good dry strength, and (2) it also helps improve the drainage ability and the paper machine runnability. Amphoteric polyacrylamides can impart a good dry strength to paper. In the meantime, such enhancers comprise components of high activity, without any problem in this regard throughout the shelf life. At present, glyoxal modified acrylamide copolymers and amphoteric polyacrylamides are widely-used enhancers.

By comparison with using separately dialdehyde-modified acrylamide polymers such as dialdehyde-modified cationic polyacrylamides (GPAM) (e.g. DADMAC-acrylamide copolymers), and unmodified polyacrylamides (PAM) (e.g., amphoteric polyacrylamides), using the combination of these two types of polymers, e.g., the combination of dialdehyde-modified cationic polyacrylamides with amphoteric polyacrylamides, as the binary enhancers can result in better performances, which combines a plurality of advantages of each component, such as dry strength, wet strength and dehydration capability.

The pH value is important to the property of final enhancing products. If pH of the binary enhancer system can be accurately adjusted to the desired value prior to use, the binary enhancer system can particularly result in the significantly increased ash retention of paper in addition to the improvements in dry strength and wet strength and dehydration capability.

Therefore, there is a need for an on-line control and reaction process for pH adjustment, particularly for a binary enhancer solution, which can flexibly realize the accurate adjustment to pH value and control it within an expected numerical range.

SUMMARY OF THE INVENTION

The present disclosure relates to an on-line control and reaction process for pH adjustment. The process is particularly suitable for the binary enhancer composition comprising a first enhancer and a second enhancer, wherein the first enhancer and the second enhancer comprise dialdehyde-modified polyacrylamides (GPAM) respectively polyacrylamides (PAM) as the active component.

In the present disclosure, assuming the polyacrylamides act as the first enhancer, the second enhancer is dialdehyde-modified polyacrylamide, and vice versa.

As known by a person skilled in the art, the pH of final output product can be controlled within the desired range by adding a pH adjuster to the binary enhancer mixture. However, due to the complexity and variability of the in-situ operation conditions, e.g., changes of the output, variable amounts of the enhancer needed and different sources of the enhancer, it is very different to obtain the desired pH value by accurately controlling the flux of the pH adjuster.

However, the inventors of the present application have found out that despite various impact factors during the process, the ideal dosage of the pH adjuster is in particular influenced by the solid content and pH value, concentration (e.g., the ratio of polyacrylamides in the final output product) of the two components in the binary enhancer, target pH value as well as flux of the final output product. It is possible to obtain a suitable flow rate of the pH adjuster by acquiring and rectifying these parameters, and thus further obtain an ideal dosage of the pH adjuster in virtue of simple and direct adjustments.

In practice, the pH values and solid contents of enhancers and pH adjuster products as received in different batches are usually inconstant. Even the nominal pH values and solid contents will usually vary within a certain scope. Due to the inaccuracy of pH value and solid content, it is very difficult to accurately control the desired dosage of the pH adjuster, i.e., the pH value of the final product. Hence, there is a need for providing a process for rectifying the parameters to eliminate the impact of such inaccuracy.

Therefore, the on-line control and reaction process according to the invention comprises the following steps:

1) providing a first enhancer and a second enhancer as well as pH adjuster to the reaction system, 2) mixing the first enhancer and the second enhancer, optionally after diluting each of both with water, 3) setting a base pH value ($\delta 1$) and a target pH value, i.e. target reaction index ($\delta 2$), 4) adding pH adjuster into the mixture via pH control unit and mixing them, to obtain the final output product with the target pH value;

wherein said pH control unit adjusts the amount of pH adjuster by measuring or inputting the following parameters:

a. the solid content ratio of the first enhancer in relation to the mixed product (r), said mixed product consisting of the first enhancer and the second enhancer, b. the solid content of the first enhancer ($\alpha$) and the solid content of the second enhancer ($\beta$), c. the pH value of the first enhancer (a) and the pH value of the second enhancer (b), d. the base pH value ($\delta 1$) and the target pH value ($\delta 2$) as set in step 3), e. the flux of the final output product (X) which is consisting of pH adjuster, a first enhancer and a second enhancer.

In one embodiment, said pH control unit adjusts the flux of pH adjuster by acquiring at least the related parameter, K1, K2, K3 and K4 and utilizing the following formula (1), so as to realize the accurate control of the flux of the pH adjuster:

$$\text{Flux of pH adjuster} = X \times (K1 - K2 + K3 + K4) \qquad (1)$$

in which

X represents the flux of final output product which is consisting of the pH adjuster, the first enhancer and the second enhancer;

K1 represents the amount of pH adjuster consumed with pH value increasing from the initial pH value to the base pH value ($\delta 1$) under varying solid content ratios of the first enhancer or second enhancer in relation to the mixed product (r), and satisfies $K1 = k_1 \times r + t$, wherein $k_1$ is the slope obtained by linear fitting and t is the intercept;

K2 represents the amount of pH adjuster consumed in relation to different pH values of the first enhancer (a) and different pH values of the second enhancer (b) under varying solid content ratios of the first enhancer or second enhancer in relation to the mixed product (r), and satisfies $K2 = 2 \times r \times k_2 \times \Delta_{pH1} + 2 \times (1-r) \times k_{2'} \times \Delta_{pH2}$, wherein $k_2$ and $k_{2'}$ represents slope or average slope obtained by linear fitting in plotting the amounts of pH adjuster consumed with pH value increasing from the respective low limit pH value, high limit pH value and average pH value of two enhancers, in which said low limit pH value and high limit pH value are respectively the nominal lowest and highest pH value of the enhancer sample, and $\Delta_{pH1}$ and $\Delta_{pH2}$ represent the difference between the inherent pH value of first enhancer, respectively second enhancer ((a) or (b)), and the average pH value of first enhancer, respectively second enhancer (($a_{ave.}$) or ($b_{ave.}$)), i.e. represent ($a-a_{ave.}$) and ($b-b_{ave.}$) respectively, in which each of said average pH value (($a_{ave.}$) or ($b_{ave.}$)) is an average determined from the pH values of n samples of the first or second enhancer and n is ≥50, preferably ≥70;

K3 represents the effect of the difference between the target reaction index ($\delta 2$) and base pH value ($\delta 1$) on the amount of pH adjuster on the basis of K2, and satisfies $K3 = (2 \times r \times k_2 + 2 \times (1-r) \times k_{2'}) \times (\delta 2 - \delta 1)$;

K4 represents the effect of varying solid content ($\alpha$) and solid content ($\beta$) on the amount of pH adjuster under base pH value ($\delta 1$), and satisfies $K4 = k_4 \times (r \times \alpha/(1-r) \times \beta) - C_1$, wherein $k_4$ represents slope obtained by linear fitting in plotting the amounts of pH adjuster consumed when the pH value is adjusted up to base pH value ($\delta 1$) against different solid content ratios of first enhancer to second enhancer, $C_1$ is a value calculated from the formula $r_0 * \alpha_{theo.} / ((1-r_0) * \beta_{theo.})$ in case of the theoretical solid content of first enhancer ($\alpha_{theo.}$) and the theoretical solid content of second enhancer ($\beta_{theo.}$), in which $r_0$ is a standard ratio of first enhancer to the mixed product and is set to 1/2.

In the process of the present disclosure and the relation formula as shown above, $\alpha$, $\beta$ and r are represented by the mass percentage (%), and X represents the flux of the mixed product, i.e. the amount of the binary enhancer needed as determined according to the amount of paper pulp to be treated on-site per unit time, which can be represented by the unit of 1/min In addition, what needs to be explained is that when conducting the final calculation according to the above formula (1), the dimensions of the parameters K1 to K4 are not taken into account, i.e. dimentionless.

Said first enhancer is selected from one of polyacrylamide enhancer and dialdehyde modified polyacrylamide enhancer, while said second enhancer is the other one.

In the process of the present disclosure and the above formulae, the solid content ($\alpha$, $\beta$) of the polyacrylamide enhancer is from 5 to 100%, preferably from 10 to 30%, and the solid content ($\alpha$, $\beta$) of the dialdehyde-modified polyacrylamide enhancer is from 5 to 100%, preferably from 6 to 20%; the pH value (a, b) of the polyacrylamide enhancer is from 2 to 8, preferably from 3 to 5, and the pH value (a, b) of the dialdehyde-modified polyacrylamide enhancer is from 2 to 7, preferably from 2 to 4; in addition, $\delta 2$ is from 7.5 to 11 and preferably from 8.5 to 9.5. The base pH value ($\delta 1$) is set between the initial pH value and target pH value ($\delta 2$) of the mixture obtained in step 3), and it is preferably >7, e.g., about 8. Generally, the initial pH values of polyacrylamide and dialdehyde-modified polyacrylamide enhancers will not exceed 7.

In step 1) of the process in accordance with the present disclosure, the two enhancers selected from dialdehyde-modified polyacrylamide enhancer (GPAM) and polyacrylamide enhancer (PAM) and a pH adjuster are provided. Here, the three reagents can be provided separately. The dialdehyde-modified polyacrylamide enhancer (GPAM) and the polyacrylamide enhancer (PAM) can be directly introduced into the reaction system, while the pH adjuster can be introduced into the reaction system via the pH control unit. The flux of the dialdehyde-modified polyacrylamide enhancer (GPAM) is generally from 0.5 to 15 ml/min, while the flux of the polyacrylamide enhancer (PAM) is generally from 0.5 to 15 ml/min. Thus, the flux of the pH adjuster may vary between 10 and 250 ml/min.

In step 2) of the process in accordance with the present disclosure, each of two enhancers selected from dialdehyde-modified polyacrylamide enhancer (GPAM) and polyacrylamide enhancer (PAM) can be diluted with water if required. When diluted with water, for example, due to the overhigh viscosity of the products that may be adverse for the operations, the polyacrylamide enhancer may be diluted to at least 9 times, preferably from 15 to 20 times. In addition, if necessary, the pH adjuster can be also diluted and the dilution multiple may range from 50 to 500, preferably from 50 to 300. Here, the dilution process may be conducted in any suitable mixing device, such as a static mixer.

Furthermore, in steps 2) and 4), it is necessary to mix the dialdehyde-modified polyacrylamide enhancer with the polyacrylamide enhancer, and mix these two enhancers with the controlled amount of pH adjuster. Here, the mixing can be conducted in any suitable mixing device, such as a static mixer. In the meantime, some auxiliary devices such as a centrifugal pump may be employed to ensure the thorough mixing.

Interpretation to Parameters

In the process in accordance with the present disclosure, K1 reflects the effects of varying solid content ratios (r) of polyacrylamide or dialdehyde-modified polyacrylamide enhancers in the mixed product on the amount of pH adjuster consumed with pH value increasing from the initial pH value to the base pH value ($\delta 1$).

There is a linear relationship between K1 and r, that is, $K1 = k_1 \times r + t$. Although different binary enhancers result in different $k_1$ and t values, a person skilled in the art can rapidly determine the values of the fixed slope $k_1$ and intercept t according to a plurality of measured discrete points and by means of the linear fitting, once the binary enhancer is determined.

With respect to the linear fitting, a person skilled in the art surely knows how to conduct the linear fitting to K1 (and also K2-K4 as will be discussed in the following). For example, at least three measured points with suitable intervals may be acquired for the linear fitting. Herein, more measured points, such as 5 or 8 points, are also possible.

K2 reflects the effects of different pH values of the first enhancer (a) and different pH values of the second enhancer (b) on the amount of the consumed pH adjuster under varying different ratios (r) of polyacrylamide enhancer or dialdehyde-modified polyacrylamide enhancer in the mixed product. This parameter takes into consideration the impact of the difference between actual pH values (a, b) of polyacrylamide enhancer and dialdehyde-modified polyacrylamide enhancer and measured average pH values thereof in the same batch on the amount of the consumed pH adjuster.

In one embodiment, the parameter r, for example, represents the ratio of the polyacrylamide enhancer (the first enhancer) in the mixed product, and thus $K2 = 2 \times r \times k_2 \times (a \times a_{ave.}) + 2 \times (1-r) \times k_{2'} \times (b - b_{ave.})$, wherein $k_2$ and $k_{2'}$ represents slope or average slope obtained by linear fitting in plotting the amounts of pH adjuster consumed with pH value increasing from the respective low limit pH value, high limit pH value and average pH value of polyacrylamide enhancer and dialdehyde-modified polyacrylamide enhancer.

Said low limit pH value and high limit pH value are respectively the nominal lowest and highest pH value of the enhancer sample. For example, these two pH values may be the upper limit value and lower limit value of the pH range signed by the manufacturer of the enhancer reagents in the same batch. For the same manufacturer and the same batch, these two values are substantially fixed. For example, the lower limit and upper limit pH values of polyacrylamide enhancer are respectively 2.5 and 3.49, and the lower limit and upper limit pH values of dialdehyde-modified polyacrylamide enhancer are respectively 2.91 and 3.46.

The average pH value can be acquired by measuring actual pH values of n enhancer samples in the same batch. For the same manufacturer and the same batch, this value can be fixed by simple measurement and calculation. Here, n is ≥50, preferably ≥70 and such as 80.

K3 reflects the effects of the difference between the target reaction index ($\delta 2$) (i.e., the final target pH value) and base pH value ($\delta 1$) on the amount of pH adjuster under the set target reaction index ($\delta 2$), and satisfies $K3 = (2 \times r \times k_2 + 2 \times (1-r) \times k_{2'}) \times (\delta 2 - \delta 1)$, wherein $\delta 2$ is from 7.5 to 11 and preferably 8.5 to 9.5. In addition, in the calculation of K1 and K3, the base pH value $\delta 1$ may be set to be >7, preferably about 8.

K4 reflects the effects of varying ratios of polyacrylamide enhancer or dialdehyde-modified polyacrylamide enhancer in the final product on the amount of pH adjuster under base pH value ($\delta 1$), in case that there exists difference between the solid content ($\alpha$) of first enhancer or the solid content ($\beta$) of second enhancer and the standard values.

Specifically, K4 satisfies $K4 = k_4 \times (r \times \alpha/(1-r) \times \beta) - C_1$, wherein $k_4$ represents the slope obtained by linear fitting in plotting the amounts of pH adjuster consumed when the pH value is adjusted up to base pH value ($\delta 1$) against different ratios of polyacrylamide enhancer to dialdehyde-modified polyacrylamide enhancer, $C_1$ is a value calculated from the formula $r_0 * \alpha_{theo.}/((1-r_0) * \beta_{theo.})$ in case of the theoretical solid content of first enhancer ($\alpha_{theo.}$) and the theoretical solid content of second enhancer ($\beta_{theo.}$), in which $r_0$ is a standard ratio of first enhancer to the mixed product and may be set to 1/2.

In practice, with respect to the enhancer, the theoretical solid content of the polyacrylamide and dialdehyde-modified polyacrylamide depends on the formulation or the nominal formulation of the enhancer. Generally speaking, an enhancer product with constant quality of a certain manufacturer will have the relatively steady formulation, rendering $\alpha_{theo.}$ and $\beta_{theo.}$ easily calculated and the parameter $C_1$ constant.

Moreover, in one preferred embodiment, in addition to the above factors K1 to K4, the factor K5 may be taken into account for more accurately adjusting the flux of the pH adjuster, i.e. the concentration deviation of the pH adjuster per se that is used to correct the actual flux of the pH adjuster.

The pH adjuster, e.g., NaOH, may be on-site prepared or may be commercially-available products, either used in the form of solid or liquid or in the form of dispersion or solution. In case of commercially-available products used, there exists usually a deviation between the nominal concentration and the actual concentration. Under this situation, the parameter K5 is set to correct the actual concentration of the pH adjuster, for example, $K5 = C_{nominal}/C_2$, wherein $C_{nominal}$ represents the nominal concentration of the product and $C_2$ represents the measured actual concentration. Accordingly, the calculation formula as above described is as follows:

$$\text{flux of the pH adjuster} = X \times (K1 - K2 + K3 + K4) \times K5.$$

Obviously, a person skilled in the art will understand that the value of K5 may theoretically range from greater than 0 to 100%.

In one embodiment, for example, the ratio of the polyacrylamide enhancer in the mixed product may be set to r (the first enhancer). Accordingly, a person skilled in the art will understand that the parameter $\alpha$ represents the solid content of the polyacrylamide enhancer; the parameter $\beta$ represents the solid content of the dialdehyde-modified polyacrylamide enhancer; the parameter a represents the pH value of the polyacrylamide enhancer; and the parameter b represents the pH value of the dialdehyde-modified polyacrylamide enhancer. Thus, the above parameters can be used for the above formula (1) to conduct the corresponding calculations.

Binary Enhancer Composition

In the specification, the binary enhancer comprises dialdehyde-modified polyacrylamide enhancer and polyacrylamide enhancer as the active ingredients. The dialdehyde-modified polyacrylamide enhancer per se is a commonly-used additive for papermaking, and it can be obtained by modifying polyacrylamide enhancer with dialdehyde.

In the context of the present disclosure, the abbreviation "GPAM" used herein refers to a dialdehyde modified polyacrylamide, especially glyoxal-modified polyacrylamide. The abbreviation "PAM" used herein refers to the polyacrylamide.

Said polyacrylamide may be cationic, anionic or amphoteric. Accordingly, the dialdehyde-modified polyacrylamide may be also cationic, anionic or amphoteric. The cationic polyacrylamide is a copolymer of one or more acrylamide monomers with one or more cationic monomers (see, e.g., U.S. Pat. Nos. 7,641,766B2, 7,901,543B2). The anionic polyacrylamide is a copolymer of one or more acrylamide monomers with one or more anionic monomers (see, e.g., WO0011046A1). The amphoteric polyacrylamide is a copolymer of one or more acrylamide monomers, one or more cationic monomers and one or more anionic monomers (see, e.g., WO0011046A1). Herein, The contents disclosed in these three references U.S. Pat. Nos. 7,641,766B2, 7,901, 543B2, and WO0011046A1 are all incorporated herein by reference.

"Acrylamide monomer" means the monomer of formula wherein $R_1$ is H or $C_1$-$C_4$ alkyl and $R_2$ is H, $C_1$-$C_4$ alkyl, aryl or arylalkyl. Acrylamide monomers may include acrylamide or methylacrylamide, for example, acrylamide.

"Alkyl" means a monovalent group derived from a straight or branched chain saturated hydrocarbon by the removal of a single hydrogen atom. Representative alkyl groups include methyl, ethyl, n- and iso-propyl, cetyl, and the like.

"Alkylene" means a divalent group derived from a straight or branched chain saturated hydrocarbon by the removal of two hydrogen atoms. Representative alkylene groups include methylene, ethylene, propylene, and the like.

"Aryl" means an aromatic monocyclic or multicyclic ring system of about 6 to about 10 carbon atoms. The aryl is optionally substituted with one or more $C_1$-$C_{20}$ alkyl, alkoxy or haloalkyl groups. Representative aryl groups include phenyl or naphthyl, or substituted phenyl or substituted naphthyl.

"Arylalkyl" means an aryl-alkylene-group where aryl and alkylene are as defined above. Representative arylalkyl groups include benzyl, phenylethyl, phenylpropyl, 1-naphthylmethyl, and the like, e.g., benzyl.

There is no special limitation to the di-aldehyde. The di-aldehyde may be selected from glyoxal, malonaldehyde, succinic aldehyde and glutaraldehyde, preferably glyoxal.

There is no special limitation to the cationic monomer. The cationic monomer can be one or more selected from a group consisting of diallyldimethylammonium chloride, N-(3-dimethylaminopropyl)methyl acrylamide, N-(3-dimethylaminopropyl) acrylamide, methylacryloyloxyethyltrimethyl ammonium chloride, acryloyloxyethyltrimethyl ammonium chloride, methylacryloyloxyethyldimethylbenzyl ammoinum chloride, acryloyloxyethyldimethylbenzyl ammonium chloride, (3-acrylamidopropyl)trimethyl ammonium chloride, methylacrylamidopropyltrimethyl ammonium chloride, 3-acrylamido-3-methylbutyltrimethyl ammonium chloride, 2-vinylpyridine, 2-(dimethylamino) ethyl methacrylate, and 2-(dimethyamino)ethyl acrylate. For example, the cationic monomers may be diallyldimethylammonium chloride (DADMAC).

There is no special limitation to the anionic monomer. The anionic monomer can be one or more selected from a group consisting of acrylic acid, methacrylic acid, itaconic acid, maleic acid, and maleic anhydrid and the salts thereof. For example, the anionic monomer can be acrylic acid.

In the context, there is no special limitation to the sum of the anionic monomers and/or cationic monomers, as long as a stable polymer is prepared. For example, the sum of the anionic monomers and/or cationic monomers can be 0.1-50 mol %, such as 1-20 mol %, of the copolymer, depending on the practical application, but without being limited to those.

In the context, there is no special limitation to the ratio of dialdehyde to acrylamide (G/A ratio) in the dialdehyde modified polyacrylamide. The G/A ratio can be 0.01:1-1:1 (molar ratio), e.g., 0.1:1-0.8:1 (molar ratio).

In the context, there is no special limitation to the ratio of cationic monomers to anionic monomers in the amphoteric dialdehyde modified polyacrylamide. For example, the ratio of cationic monomers to anionic monomers may be 1:100-100:1 by molar, such as 1:10-10:1 by molar, depending on the practical application, but without being limited to those.

In order to achieve the effects of the present invention, the weight average molecular weight of the dialdehyde-modified polyacrylamide is critical which may range from 100,000 to 2,000,000 daltons, such as from 120,000 to 1,500,000 daltons, such as from 200,000 to 1,200,000 daltons, such as from 150,000 to 1,100,000 daltons, and such as from 200,000 to 1,000,000 daltons. The weight average molecular weight of the dialdehyde-modified polyacrylamide may also range from 100,000 to 300,000 daltons, such as from 150,000 to 300,000 daltons and such as from 200,000 to 300,000 daltons.

Preferably, the weight average molecular weight of the polyacrylamide ranges from 500,000 to 5,000,000 g/mol. Preferably, the weight average molecular weight of the dialdehyde-modified polyacrylamide ranges from 200,000 to 2,000,000 g/mol.

There is no special limitation to the solid content of the dialdehyde-modified polyacrylamide in the enhancer solution. Taking into consideration the facilities of the preparation and operation, the solid content may range from 0.1 to 50 wt %, for example from 1 to 20 wt %, and further for example from 5 to 15 wt %.

The dialdehyde-modified polyacrylamide can be prepared according to the known technology, for example, the process disclosed in U.S. Pat. No. 7,641,766 B2, the contents disclosed in this document being incorporated by reference into the present application in their entirety. It should be noted that, in the process of producing the dialdehyde-modified polyacrylamide, a cross-linking agent and/or a chain transfer agent can be used to provide a branched/cross-linked structure of the copolymer. As commercially available dialdehyde-modified polyacrylamide enhancers, Nalco 64280, Nalco 64170, and Nalco 64180 can be exemplarily listed.

pH Adjuster

In the present disclosure, the pH adjuster is well known for a person skilled in the art, and it can be an inorganic or organic alkaline substance with pH value ranging from 9 to 14, for example, sodium hydroxide, potassium hydroxide or ammonia, and carbonate salts of alkali metals.

ILLUSTRATIONS TO THE DRAWINGS

FIG. 1 schematically shows an on-line automatic control device for pH adjustment in accordance with the process of the present disclosure. According to FIG. 1, a binary enhancer is provided at first which comprises dialdehyde-modified polyacrylamide GPAM1 and polyacrylamide PAM2. Meanwhile, the solid contents α and β of both compounds are measured and also the respective inherent pH values, e.g., 3 to 4, as the parameters a and b, respectively. Herein, optionally, GPAM 1 and PAM 2 are introduced separately via pipelines into a diluting unit 3 comprising a mixer such as a static mixer, so as to be mixed with water. The dilution step may be carried out as required and depend on the source and viscosity of these two enhancers GPAM 1 and PAM 2. Subsequently, after mixing these two enhancers, the base pH value δ1 4is set to e.g. pH=8 and compared with the target pH value δ2, i.e., the target reaction index 6 (e.g., the pH=9). Then the ideal indication for the amount (or flux) of the pH adjuster can be obtained from the pH control unit 5, according to which a suitable dosage of the pH adjuster 7 (e.g., the aqueous NaOH solution) is added to the mixture of GPAM 1 and PAM 2. The mixture is mixed in the mixer 8 for a sufficient period, thereby obtaining the final output product PM which satisfies the target pH value. In the pH control unit, the parameter X, i.e., the flux of the final product PM can be determined according to the on-site output.

Said pH control unit 5 may be operated manually or automatically, preferably automatically. In one embodiment of the present disclosure as shown in FIG. 7, which is just illustrative and depicts the structure essential for understanding the present invention, the pH control unit 5 is an automatic control device comprising at least input port A, output port B and calculation center C, in which input port A receives the signals corresponding to the following parameters and input them into the calculation center C: the solid content ratio of the first enhancer in relation to the mixed product (r), the solid content of the first enhancer ($\alpha$) and the solid content of the second enhancer ($\beta$), the pH value of the first enhancer (a) and the pH value of the second enhancer (b), the base pH value ($\delta 1$) as set, the target pH value, i.e. target reaction index ($\delta 2$), the flux of the final output product (X) and optionally actual concentration of pH adjuster as measured ($C_2$);

and then calculation center C transmits into output port B the flux of pH adjuster as calculated according to the process as described above, especially according to formula (1), said output port B adapting the pH adjuster flux to the calculated flux of pH adjuster via pipeline and flux control apparatus.

In the calculation center C (e.g., a calculator), the above formula (1) and parameters in relation to K1-K4 and optional K5 like $k_1$, t, $k_2$, $k_{2'}$, $a_{ave.}$, $b_{ave.}$, $k_4$, $C_1$ and optional $C_{nominal}$ are set and fixed in advance. Said calculation center C may transmit the calculated flux value of the pH adjuster via electrical signal to the output port B and control the port B to adjust the flux of the pH adjuster.

The process and the on-line automatic control device according to the present invention are in particular suitable for use in papermaking, water treatment, mining and petroleum industries.

Figure 7:
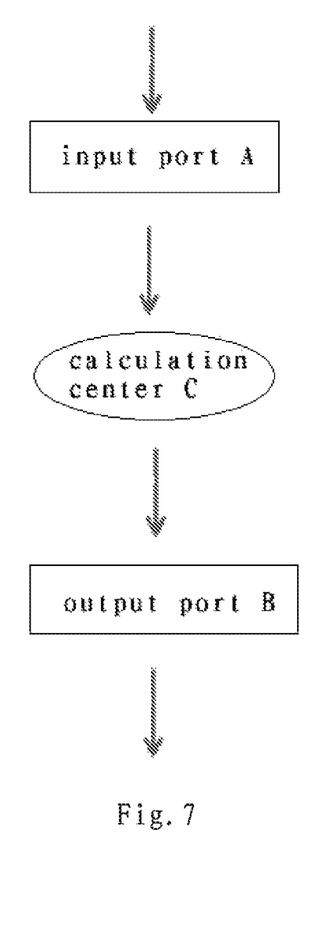
FIG. 7 is the schematic diagram for the automatic control device for the pH adjusting unit.

REFERENCE SIGNS LIST 1 dialdehyde-modified polyacrylamide GPAM
2 polyacrylamide PAM
3 diluting unit
4 setting base pH value
5 pH control unit
6 setting target pH value, target reaction index
7 pH adjuster, aqueous NaOH solution
8 mixer PM final output product The arrow represents the flowing direction of the stream (FIG. 1) or the transmitting direction of data (FIG. 7).

EXAMPLES

The invention is described in more detail by referring to the following Examples, but is not limited to these Examples.

1. Calculation Examples for the Flux of pH Adjuster (1) Reagents as Used

TX 15241: dialdehyde-modified DADMAC/polyacrylamide (GPAM) having the solid content of 9-12% in general, the pH of 2.36 to 3.46 and the viscosity at 25° C. of 16-28 cps, available from Ecolab Company TX 15951: polyacrylamide (PAM) having the solid content of 19.5-22% in general, the pH of 2.5-3.49 and the viscosity at 25° C. of 4000 to 10000 cps, available from Ecolab Company TX 16389: 48% NaOH having the solid content of 46-50% in general, available from Ecolab Company (2) Calculations of the Parameters K1 to K5

It is well understood for a person skilled in the art that the following calculation examples are just illustrative and can be conducted by programming of the computers or other auxiliary devices.

Calculation of K1

The base pH value $\delta 1$ was set at 8. The amount of pH adjuster consumed with pH value increasing from the initial pH value of the product to the base pH value 8 under varying solid content ratios (r) of the polyacrylamide TX 15951 in the mixed product was measured.

Figure 2:
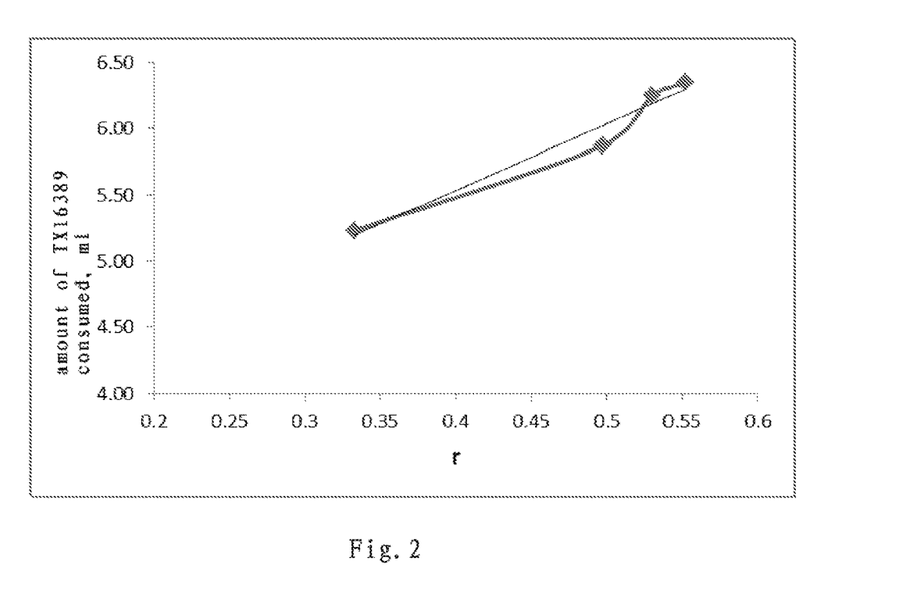
FIG. 2 is a schematic diagram for K1 calculation in the examples.

During this procedure, r value was varied with other parameters to be fixed. TX 15951 and TX 15241 were formulated into 1 kg of the respective mixed products with different ratios, and each of the compositions of TX 15921 and TX 15241 with different ratios were titrated with pH adjuster TX 16389 solution one by one. The respective amounts of TX 16389 consumed for adjusting the pH value from the initial pH value to the base pH value of 8 were recorded in Table 1. Plotting the corresponding curve according to the values as shown in Table 1, and linear fitting to obtain FIG. 2 and the formula of K1: K1=(4.9754×r+3.5422).

TABLE 1

Effects of varying r values on the amount of TX 16389

| r | Amount of TX 16389, ml |
|---|---|
| 0.33 | 5.2317 |
| 0.497 | 5.8678 |
| 0.53 | 6.2444 |
| 0.5515 | 6.3424 |

Calculation of K2

In this batch, the nominal low limit pH value of TX 15951 was 2.5 and the nominal high limit pH value was 3.49. The average pH value as measured from 80 samples was 3.38. The nominal low limit pH value of TX 15241 was 2.36 and the nominal high limit pH value was 3.46. The average pH value as measured from 80 samples was 2.91. Then, TX 15951 and TX15241 were formulated into a mixed product according to the ratio r of TX 15951 in the mixed product of 0.5.

In the experiment, the amounts of TX 16389 consumed by titration with pH value gradually increasing from the respective low limit pH value, high limit pH value and average pH value of TX 15241 and TX 15951 to different pH values were studied and recorded in Tables 2 and 3. Plotting FIGS. 3, 4, and 5 according to the measured data in Tables 2 and 3, and calculating the average slope values $k_2$ and $k_{2'}$ of the linear curves of TX 15241 and TX 15951.

TABLE 2

TX 15241

| Low limit pH value | | Average pH value | | High limit pH value | |
|---|---|---|---|---|---|
| pH | Amount of TX 16389 | pH | Amount of TX 16389 | pH | Amount of TX 16389 |
| 7.48 | 2.0783 | 8.09 | 1.715 | 7.73 | 1.07 |
| 8.38 | 2.31 | 8.76 | 1.872 | 8.45 | 1.275 |
| 9.31 | 2.49 | 9.21 | 2.027 | 9.14 | 1.652 |
| 9.48 | 2.53 | 9.29 | 2.067 | 9.43 | 1.7767 |
| 9.56 | 2.66 | 9.62 | 2.228 | 9.55 | 1.9967 |
|  |  | 9.92 | 2.408 |  |  |

TABLE 3

TX 15951

| Low limit pH value | | Average pH value | | High limit pH value | |
|---|---|---|---|---|---|
| pH | Amount of TX 16389 | pH | Amount of TX 16389 | pH | Amount of TX 16389 |
| 7.85 | 4.79 | 8.51 | 5.34 | 7.96 | 3.331 |
| 8.26 | 5.59 | 8.83 | 6.055 | 8.43 | 4.35 |
| 8.74 | 6.66 | 9.17 | 6.78 | 8.88 | 5.325 |
| 9.22 | 7.74 | 9.46 | 7.34 | 9.19 | 6.01 |
| 9.63 | 8.55 | 9.79 | 7.94 | 9.68 | 7.09 |

Figure 3:
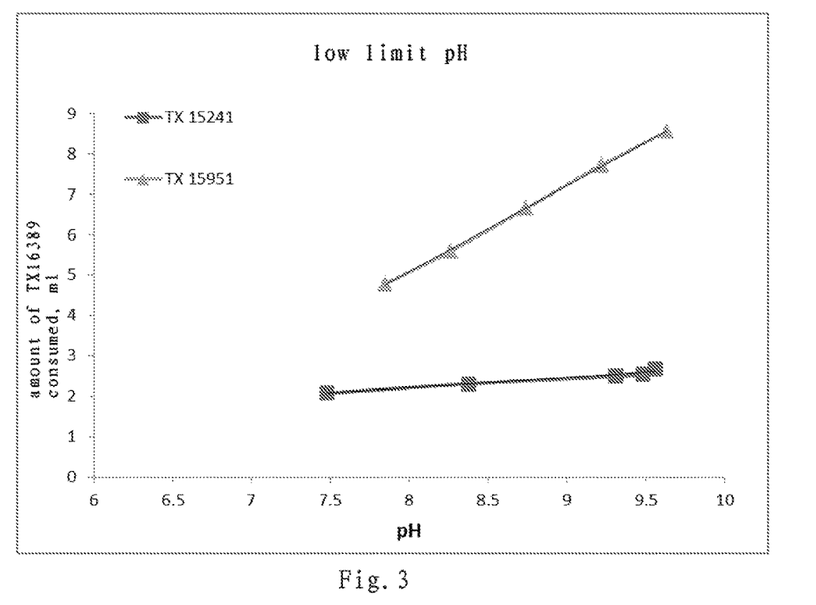
FIGS. 3 to 5 are schematic diagrams for K2 calculation in the examples.
Figure 4:
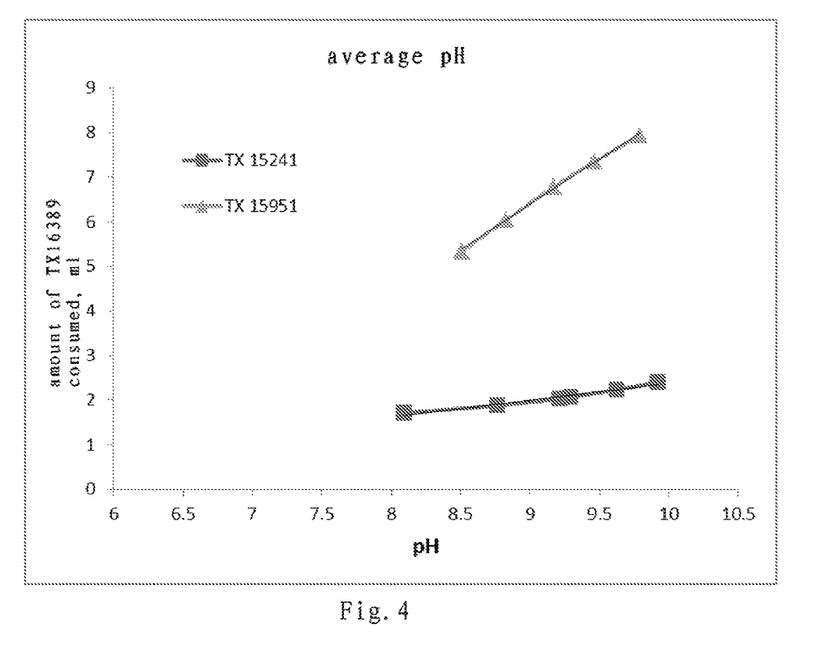
Figure 5:
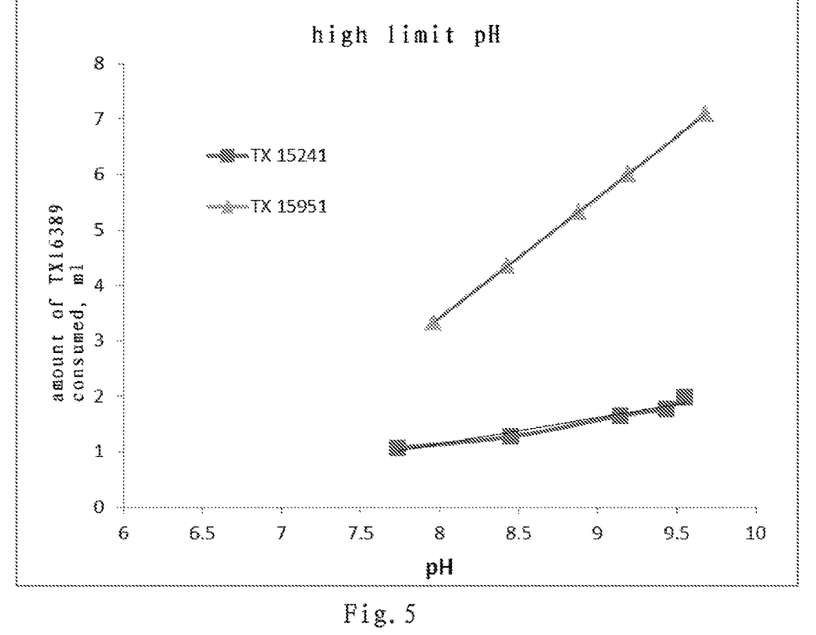

As shown in FIGS. 3-5, the relations of respective pH value changes as calculated by the linear fitting under the low limit pH value, the average pH value and the high limit pH value of TX 15951 with the amount of TX 16389 were respectively shown as follows, wherein $Y_1$, $Y_{1'}$, $Y_{1''}$ and $X_1$, $X_{1'}$, $X_{1''}$ corresponded to the Y-coordinate and the X-coordinate, respectively:

$$Y_1=2.1391X_1-12.032 \quad \text{(FIG. 3)},$$

$$Y_{1'}=2.0506X_{1'}-12.082 \quad \text{(FIG. 4)},$$

$$Y_{1''}=2.1847X_{1''}-14.064 \quad \text{(FIG. 5), and}$$

the average value of slope $k_2$ is 2.1248.

The relations of respective pH value changes as calculated by the linear fitting under the low limit pH value, the average pH value and the high limit pH value of TX 15241 with the amount of TX 16389 were respectively shown as follows, wherein $Y_2$, $Y_{2'}$, $Y_{2''}$ and $X_2$, $X_{2'}$, $X_{2''}$ corresponded to the Y-coordinate and the X-coordinate, respectively:

$$Y_2=0.2492X_2+0.213 \quad \text{(FIG. 3)},$$

$$Y_{2'}=0.4637X_{2'}-2.2195 \quad \text{(FIG. 4)},$$

$$Y_{2''}=0.4823X_{2''}-2.719 \quad \text{(FIG. 5), and}$$

the average value of slope $k_{2'}$ was 0.3984.

Meanwhile, taking into consideration the effect of the deviation of ratio r from base 0.5, the coefficient (r/0.5) was multiplied, i.e., 2×r.

Thereby, the formula was obtained: $K2=2 \times r \times 2.1248 \times (a-3.38)+2 \times (1-r) \times 0.3984 \times (b-2.91)$.

Calculation of K3

After calculating the parameter K2 as above described, the following formula could be easily obtained: $K3=(2 \times r \times 2.1248+2 \times (1-r) \times 0.3984) \times (\delta 2-8)$.

Calculation of K4

Figure 6:
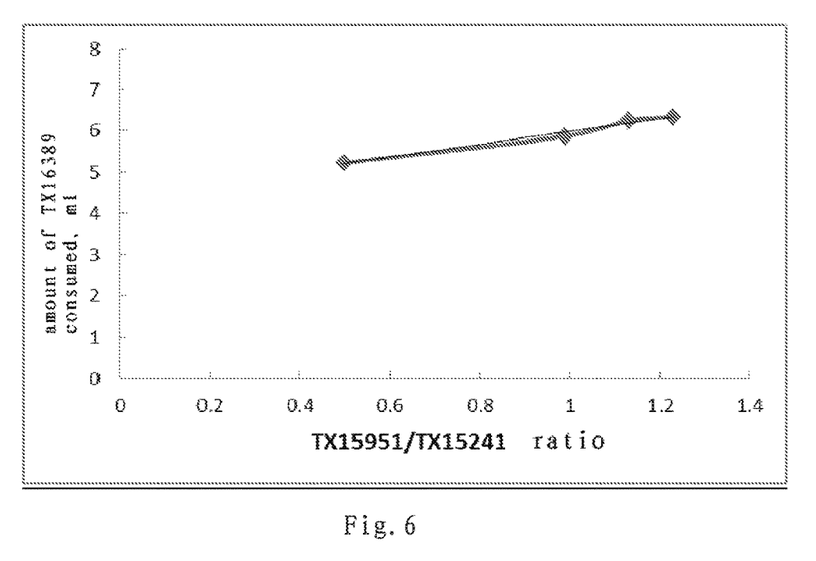
FIG. 6 is a schematic diagram for K4 calculation in the examples.

TX 15951 and TX 15241 were formulated according to the solid content ratios as recited in the left column of Table 4 into some 1 kg mixed products with different ratios, and the pH adjuster TX 16389 was used to adjust individual mixed products into the base pH of 8. The amount of the consumed TX 16389 was recorded as the data shown in the right column of Table 4. FIG. 6 was plotted according to all data in Table 4.

In addition, according to the formulation, the theoretical solid content $\alpha_{theo.}$ of TX 15951 could be obtained as 20% and the theoretical solid content $\beta_{theo.}$ of TX 15241 as 10%. Considering the deviation of the actual solid content of the product from the standard value, the standard value $r_0$ of the ratio of TX 15951 in the mixed product was set to be 1/2, and the value of $C_1$ was obtained as 2 according to the formula $r_0 * \alpha_{theo.}/((1-r_0) * \beta_{theo.}$. Furthermore, by combining the slope 1.5408 obtained from FIG. 6, K4 could be obtained as follows:

$$K4=1.5408 \times (r \times \alpha/((1-r) \times \beta)-2)$$

TABLE 4

| TX 15951: TX 15241 | TX 16389 amount, ml |
|---|---|
| 1.23 | 5.2317 |
| 1.13 | 5.8678 |
| 0.99 | 6.2444 |
| 0.55 | 6.3424 |

Calculation of K5

Since the nominal concentration of pH adjuster TX 16389 was 48%, the parameter K5 for rectifying the amount of pH adjuster TX 16389 was $48\%/C_2$.

Substituting K1 to K5 as calculated above into the formula (1), the formula (2) about the amount of pH adjuster could be obtained as follows:

Amount of pH adjuster=$X \times ((4.9754 \times r+3.5422)-(2 \times r \times 2.1248 \times (a-3.38)+2 \times (1-r) \times 0.3984 \times (b-2.91)+(2 \times r \times 2.1248+2 \times (1-r) \times 0.3984) \times (\delta 2-8)+1.5408 \times (r \times \alpha/((1-r) \times \beta)-2)) \times (48\%/C_2)$.

2. Application Example

In the automatic control device as shown in FIG. 7, comprising at least port A, output port B and calculation center C, the above-described formula (2) was programmed and fixed in the calculator of the calculation center C.

Figure 1:
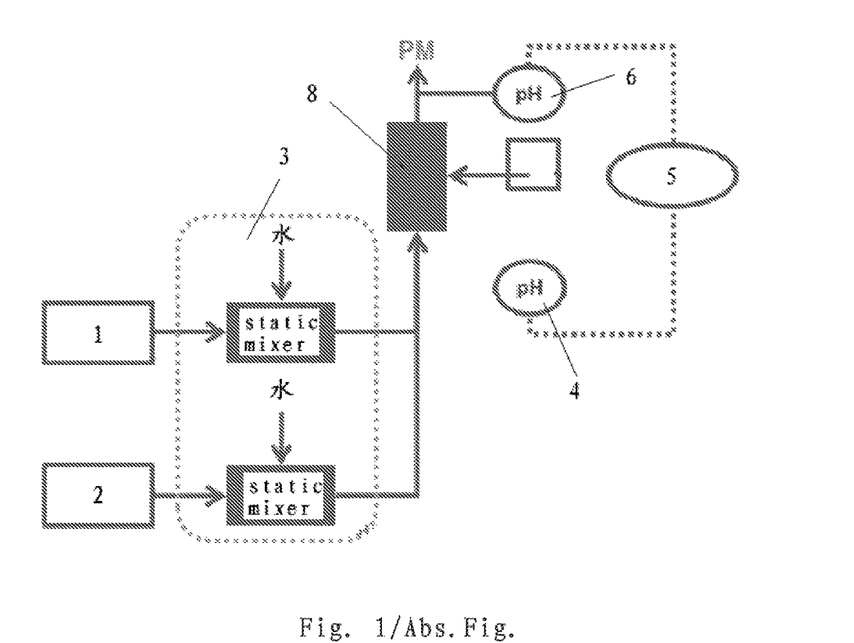

Then, the binary enhancer consisting of TX 15241 and TX 15951 and TX 16389 with the concentration of 48% were fed into the on-line control and reaction device for pH adjustment as shown in FIG. 1. The solid contents ($\alpha$, $\beta$), pH values (a, b), the solid content ratio (r) of polyacrylamide in the mixed product, flux of the final output product (X) and target pH value ($\delta 2$) were measured beforehand. Following this, these parameters were input into the output port A and then a suitable amount of pH adjuster could be achieved through the calculation in the calculator of the calculation center C and by adjusting the valve of output port B. Individual parameters and the amount of pH adjuster were shown in Table 5.

TABLE 5

Individual input parameters of the binary enhancer and the amount of pH adjuster

| Ratio of TX 15951 in the mixed product (%) r | Solid content of TX 15951 (%) α | Solid content of TX 15241 (%) β | pH value of TX 15951 a | pH value of TX 15241 b | flux of the final output product (ml/min) X | Amount of pH adjuster (ml/min) | Target pH value δ2 |
|---|---|---|---|---|---|---|---|
| 0.5 | 20 | 10 | 2.5 | 3 | 1.6 | 15.78 | 8.80 |

After such an adjustment, the obtained target pH value of the resulting final output product solution was 8.80, and the actual value as measured was 8.85.

The invention claimed is:

1. An on-line control and reaction process for pH adjustment of a binary enhancer composition comprising a first enhancer and a second enhancer, the process comprising:
   1) mixing the first enhancer and the second enhancer, optionally after diluting the first enhancer and/or the second enhancer with water, to form a mixture,
   2) setting a base pH value (δ1) and a target pH value (δ2),
   3) adding pH adjuster into the mixture via a pH control unit and mixing to obtain a product with the target pH value;
wherein the pH control unit adjusts the adding of the pH adjuster by measuring or inputting the following parameters:
   a. the solid content ratio of the first enhancer in relation to the mixed product (r), said mixed product comprising the first enhancer and the second enhancer,
   b. the solid content of the first enhancer (α) and the solid content of the second enhancer (β),
   c. the pH value of the first enhancer (a) and the pH value of the second enhancer (b),
   d. the base pH value (δ1) and the target pH value (δ2) as provided in step 2),
   e. the flux of the product.

2. The process of claim 1, wherein the pH control unit adjusts the flux of the pH adjuster via at least the related parameter, K1, K2, K3 and K4 and utilizing the following formula (1):

$$\text{flux of pH adjuster} = X \times (K1 - K2 + K3 + K4) \quad (1),$$

wherein
X represents the flux of the product (X);
K1 represents the amount of pH adjuster consumed with pH value increasing from the initial pH value to the base pH value (δ1) under varying solid content ratios of the first enhancer or second enhancer in relation to the mixed product (r), and satisfies $K1 = k_1 \times r + t$, wherein $k_1$ is the slope obtained by linear fitting and t is the intercept;
K2 represents the amount of pH adjuster consumed in relation to different pH values of the first enhancer (a) and different pH values of the second enhancer (b) under varying solid content ratios of the first enhancer or second enhancer in relation to the mixed product (r), and satisfies $K2 = 2 \times r \times k_2 \Delta_{pH1} + 2 \times (1-r) \times k_2' \ast \Delta_{pH2}$,
wherein $k_2$ and $k_2'$ represents slope or average slope obtained by linear fitting in plotting the amounts of pH adjuster consumed with pH value increasing from the respective low limit pH value, high limit pH value and average pH value of two enhancers, in which said low limit pH value and high limit pH value are respectively the nominal lowest and highest pH value of the enhancer sample, and
$\Delta_{pH1}$ and $\Delta_{pH2}$ represent the difference between the inherent pH value of first enhancer, respectively second enhancer ((a) or (b)), and the average pH value of first enhancer, respectively second enhancer (($a_{ave.}$) or ($b_{ave.}$)), in which each of said average pH value (($a_{ave.}$) or ($b_{ave.}$)) is an average determined from the pH values of n samples of the first or second enhancer and n is ≥50;
K3 represents the effect of the difference between the target reaction index (δ2) and base pH value (δ1) on the amount of pH adjuster on the basis of K2, and satisfies $K3 = (2 \times r \times k_2 + 2 \times (1-r) \times k_2') \times (\delta2 - \delta1)$;
K4 represents the effect of varying solid content (α) and solid content (β) on the amount of pH adjuster under base pH value (δ1), and satisfies $K4 = k_4 \times (r \times \alpha/(1-r) \times \beta) - C_1$,
wherein $k_4$ represents slope obtained by linear fitting in plotting the amounts of pH adjuster consumed when the pH value is adjusted up to base pH value (β1) against different solid content ratios of first enhancer to second enhancer,
$C_1$ is a value calculated from the formula $r_0 \ast \alpha_{theo.}/((1-r_0) \ast \beta_{theo.})$ in case of the theoretical solid content of first enhancer($\alpha_{theo.}$) and the theoretical solid content of second enhancer ($\alpha_{theo.}$), in which $r_0$ is a standard ratio of first enhancer to the mixed product and is set to 1/2.

3. The process of claim 1, wherein the first enhancer is a polyacrylamide enhancer and the second enhancer is a dialdehyde modified polyacrylamide enhancer.

4. The process of claim 1, wherein the solid content of the first or second enhancer (α or β) is from 5 to 100%.

5. The process of claim 1, wherein the pH value of the first or second enhancer (a or b) is from 2 to 8.

6. The process of claim 1, wherein β2 is 7.5 to 11.

7. The process of claim 1, wherein the first enhancer is a polyacrylamide enhancer.

8. The process of claim 7, wherein the polyacrylamide enhancer has a weight average molecular weight of from 500,000 to 5,000,000 g/mol.

9. The process of claim 3, wherein the dialdehyde modified polyacrylamide enhancer has a weight average molecular weight of from 200,000 to 2,000,000 g/mol.

10. The process of claim 1, wherein parameter K5 is introduced to calibrate the actual concentration of pH adjuster, $$K5 = C_{nominal}/C_2,$$

in which $C_{nominal}$ is a nominal concentration of the product and $C_2$ is an actual concentration as measured of the product.

11. The process of claim 10, wherein the flux of the pH adjuster=$X \times (K1-K2+K3+K4) \times K5$.

* * * * *

UNITED STATES PATENT AND TRADEMARK OFFICE
CERTIFICATE OF CORRECTION

PATENT NO. : 10,316,469 B2
APPLICATION NO. : 15/537018
DATED : June 11, 2019
INVENTOR(S) : Zhang et al.

Page 1 of 1

It is certified that error appears in the above-identified patent and that said Letters Patent is hereby corrected as shown below:

In the Claims

In Column 13, Claim 2, Line 62, delete "$k_2\Delta_{pH1}$" and insert --$k_2 x \Delta_{pH1}$--

In Column 13, Claim 2, Line 63, delete "$k_2$and" and insert --$k_2$ and--

In Column 14, Claim 2, Line 23, delete "$(b_{ave}))$" and insert --$(b_{ave.}))$--

In Column 14, Claim 2, Line 36, delete "$(\beta 1)$" and insert --$(\delta 1)$--

In Column 14, Claim 2, Line 41, delete "enhancer$(\alpha_{theo.})$" and insert --enhancer $(\alpha_{theo.})$--

In Column 14, Claim 2, Line 42, delete "$(\alpha_{theo.})$" and insert --$(\beta_{theo.})$--

In Column 14, Claim 4, Line 48, delete "$(\alpha or\ \beta)$" and insert --$(\alpha\ or\ \beta)$--

In Column 14, Claim 6, Line 51, delete "$\beta 2$" and insert --$\delta 2$--

In Column 14, Claim 10, Line 64, delete "$C_{nomimal}$" and insert --$C_{nominal}$--

In Column 14, Claim 10, Line 65, delete "$C_{nomiunal}$" and insert --$C_{nominal}$--

Signed and Sealed this
Twenty-seventh Day of August, 2019

Andrei Iancu
*Director of the United States Patent and Trademark Office*